(12) United States Patent
Poch et al.

(10) Patent No.: US 7,987,546 B2
(45) Date of Patent: Aug. 2, 2011

(54) CLEANING MACHINE

(75) Inventors: Alfred Poch, Auenwald (DE); Michael Oesterle, Weissach (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 12/799,591

(22) Filed: Apr. 26, 2010

(65) Prior Publication Data

US 2010/0275395 A1 Nov. 4, 2010

Related U.S. Application Data

(63) Continuation of application No. PCT/EP2008/006744, filed on Aug. 16, 2008.

(30) Foreign Application Priority Data

Oct. 30, 2007 (DE) .......................... 10 2007 053 351

(51) Int. Cl.
*A46B 13/02* (2006.01)
*A47L 11/19* (2006.01)
(52) U.S. Cl. .......................................... 15/49.1; 15/179
(58) Field of Classification Search .................... 15/179, 15/49.1
See application file for complete search history.

(56) References Cited

U.S. PATENT DOCUMENTS

| | | | |
|---|---|---|---|
| 3,019,042 A | 1/1962 | Smith | |
| 4,357,137 A | 11/1982 | Brown | |
| 5,421,053 A | 6/1995 | Chodak | |
| 6,324,714 B1 | 12/2001 | Walz et al. | |
| 6,974,193 B2 * | 12/2005 | Gaser et al. | 300/21 |
| 7,587,779 B2 | 9/2009 | Walz et al. | |
| 2008/0216259 A1 | 9/2008 | Walz et al. | |

FOREIGN PATENT DOCUMENTS

| | | |
|---|---|---|
| DE | 32 47 087 | 6/1984 |
| DE | 33 42 833 | 6/1985 |
| DE | 36 03 287 | 8/1987 |
| DE | 93 02 180 | 4/1993 |
| DE | 198 20 628 | 9/1999 |
| DE | 201 12 322 | 10/2001 |
| DE | 20 2004 019 173 | 2/2005 |
| DE | 10 2005 045 310 | 3/2007 |
| EP | 1 279 363 | 1/2003 |
| EP | 1 428 468 | 6/2004 |
| EP | 1 449 474 | 8/2004 |
| GB | 2 262 433 | 6/1993 |
| RU | 2 259 799 | 3/2005 |

* cited by examiner

*Primary Examiner* — Randall Chin

(74) *Attorney, Agent, or Firm* — Lipsitz & McAllister, LLC

(57) ABSTRACT

The invention relates to a cleaning machine with at least one cleaning tool which is adapted to be driven in rotation by way of a drive shaft that is rotatably mounted on a carrier, the drive shaft carrying a torque-transmission member which engages, by way of protrusions, in drive recesses of the cleaning tool. In order for it to be possible for the cleaning machine to be manufactured more cost-effectively, it is proposed according to the invention that the drive shaft is made from metal, and that the torque-transmission member is formed, as a plastics-material molding, onto the drive shaft.

10 Claims, 3 Drawing Sheets

CLEANING MACHINE

This application is a continuation of international application number PCT/EP2008/006744 filed on Aug. 16, 2008 and claims the benefit of German Patent Application No. 10 2007 053 351.0 filed on Oct. 30, 2007.

The present disclosure relates to the subject matter disclosed in international application number PCT/EP2008/006744 of Aug. 16, 2008 and German application number 10 2007 053 351.0 of Oct. 30, 2007, which are incorporated herein by reference in their entirety and for all purposes.

BACKGROUND OF THE INVENTION

The invention relates to a cleaning machine with at least one cleaning tool which is adapted to be driven in rotation by way of a drive shaft that is rotatably mounted on a carrier, the drive shaft carrying a torque-transmission member which engages, by way of protrusions, in drive recesses of the cleaning tool.

A cleaning machine of this kind is known, in the form of a sweeping machine, from patent specification DE 198 20 628 C1. The cleaning tool used in the sweeping machine is a brush roller which can be driven in rotation and has its two ends mounted in a rotatable manner on a frame. The brush roller is driven in rotation via a gearwheel which is disposed on a drive shaft and engages, by way of its teeth, in drive recesses of the brush roller. The gearwheel is configured in a single piece with the drive shaft, which can be driven in rotation, the teeth being milled out of the drive shaft by virtue of the shaft being subjected to appropriate follow-up processing. This is associated with significant production costs.

European patent specification EP 1 279 363 B1 discloses a cleaning machine in the form of a scrubbing machine in which the cleaning tool is made to rotate via a drive shaft which is connected in a rotationally fixed manner, via a slot and key connection, to a gearwheel which forms the torque-transmission member. The provision of the slot and key connection is likewise associated with not inconsiderable production costs.

It is an object of the present invention to develop a cleaning machine of the type mentioned in the introduction such that it can be manufactured more cost-effectively.

SUMMARY OF THE INVENTION

This object is achieved according to the invention, in the case of a cleaning machine of the type mentioned in the introduction, in that the drive shaft is made from metal, and in that the torque-transmission member is formed, as a plastics-material molding, onto the drive shaft.

According to the invention, the torque-transmission member is configured in the form of a plastics-material molding, whereas the drive shaft is produced from metal. A bearing, in particular a ball bearing, may be pressed onto the metallic drive shaft. The torque-transmission member is molded onto the metallic drive shaft, and ensures the rotary connection between the drive shaft and the cleaning tool. As a result of the torque-transmission member being molded onto the drive shaft, a significant reduction in the production costs is made possible.

The configuration according to the invention also has the advantage that the torque-transmission member is made from a softer material than the drive shaft. This allows damped mounting, so that the level of noise produced during operation of the cleaning machine can be reduced.

Furthermore, using, for the torque-transmission member, a plastics material which is molded onto the drive shaft has the advantage that the plastics material of the torque-transmission member, this material being softer than the metal of the drive shaft, allows face-to-face engagement of the protrusions of the torque-transmission member against the drive recesses of the cleaning tool. The face-to-face engagement reduces the loading on the torque-transmission member during transmission of a torque from the drive shaft to the cleaning tool. This, in turn, results in the service life being extended.

It is advantageous if the torque-transmission member is molded onto the drive shaft. The production costs can thus be kept particularly low.

As already explained, it is advantageous if the hardness of the torque-transmission member is less than the hardness of the drive wheel. It is particularly advantageous if the torque-transmission member has a Shore hardness of 60 to 80, in particular a Shore hardness of 70. The torque-transmission member is thus comparatively soft. As a result, this makes possible a damping of the mounting of the cleaning tool on the carrier of the cleaning machine, and thus to reduce the level of noise produced during operation of the cleaning machine; in addition, the Shore hardness of 60 to 80, in particular a Shore hardness of 70, reliably avoids the situation where the torque-transmission member is subjected to linear loading.

In the case of a particularly preferred configuration, the torque-transmission member is produced from a polyurethane material. The polyurethane material can easily be molded onto the merely roughly processed metallic drive shaft. The drive shaft can be treated, for example, just by sandblasting. For the purpose of improving the adhesion of the polyurethane material to the drive shaft, the latter can be treated with an adhesion-promoting agent prior to the polyurethane material being molded on. Such adhesion-promoting agents are known to the person skilled in the art.

The torque-transmission member has outwardly projecting, preferably radially oriented protrusions. It is particularly advantageous if the torque-transmission member has a star-shaped cross-sectional profile with rounded tips. It has been found that such a cross-sectional profile makes possible, in a particularly reliable manner, face-to-face engagement of the torque-transmission member against the drive recesses of the cleaning tool. Moreover, such a cross-sectional profile facilitates the centering of the torque-transmission member in the drive recesses of the cleaning tool.

In the case of a particularly preferred configuration of the cleaning machine according to the invention, at least one axially projecting tolerance-compensating member is disposed on the torque-transmission member. The at least one tolerance-compensating member makes it possible to compensate for tolerances in the axial direction of the cleaning tool, that is to say in the longitudinal direction of the latter. It is thus easily possible to compensate for production tolerances in a cost-effective manner.

It is advantageous if the at least one tolerance-compensating member is elastically deformable. This makes possible not just straightforward compensation for production tolerances, but also elastic prestressing of the cleaning tool in the axial direction.

A plurality of tolerance-compensating members are preferably spaced apart from one another. It is possible to use, for example, three uniformly spaced-apart tolerance-compensating members distributed over the circumference of the drive shaft.

It is particularly advantageous if the at least one tolerance-compensating member is produced from a plastics material. It may be provided, in particular, that the tolerance-compensating member is made from the same plastics material as the torque-transmission member.

It is advantageous if the at least one tolerance-compensating member and the torque-transmission member are connected integrally to one another and form a single-piece plastics-material molding. This allows particularly cost-effective production since the at least one tolerance-compensating member and the torque-transmission member can be produced in a common production step.

The cleaning tool is preferably configured as a brush roller. The latter may have a cylindrical roller body which comprises the drive recesses and from which a multiplicity of cleaning bristles project on the outside.

The following description of a preferred embodiment of the invention serves, in conjunction with the drawings, to give a more detailed explanation.

DETAILED DESCRIPTION OF THE INVENTION

Figure 1:
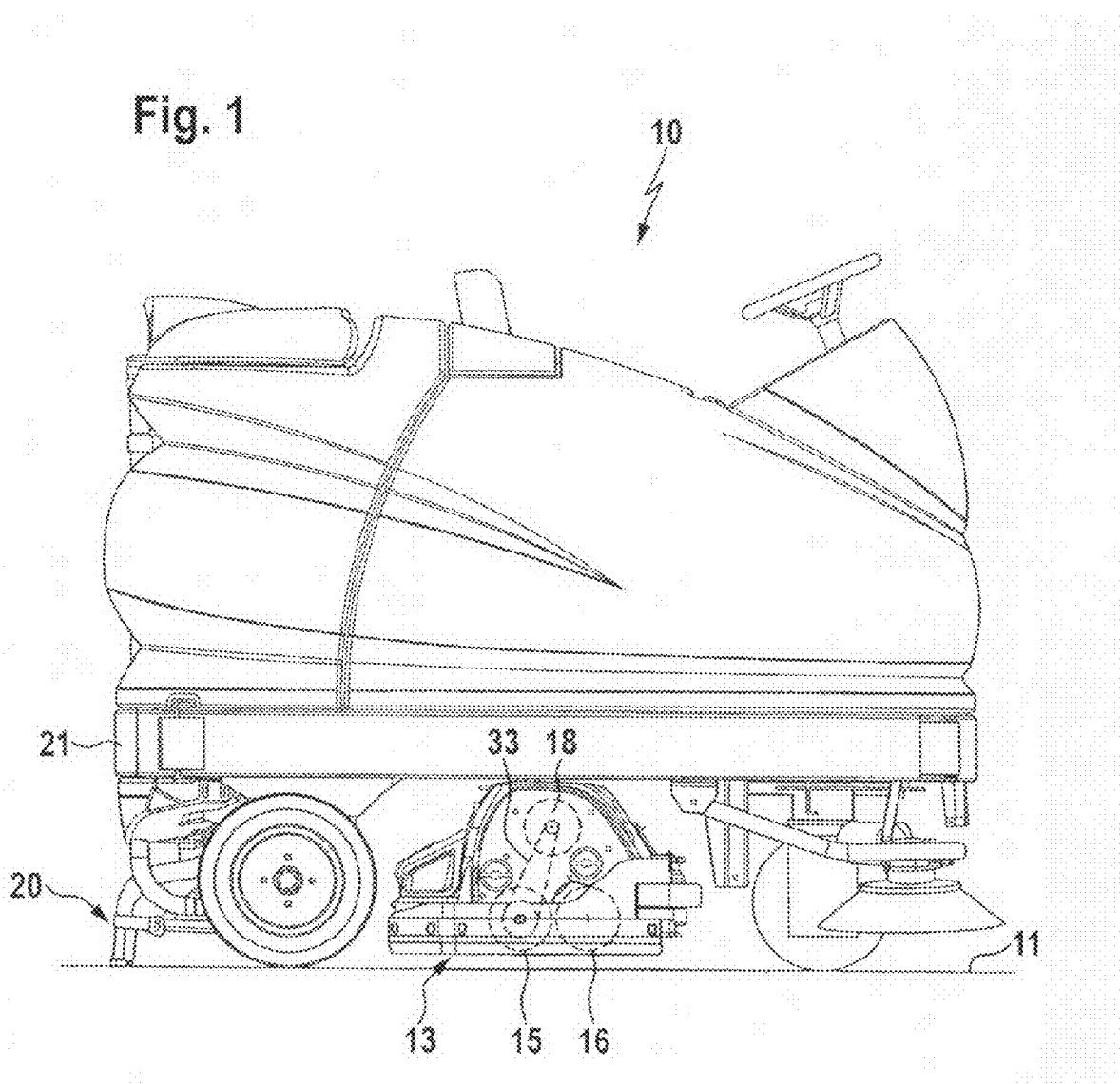
FIG. 1 shows a side view of a cleaning machine according to the invention.

FIG. 1 illustrates, schematically, a cleaning machine according to the invention in the form of a floor-cleaning machine 10. The latter can be displaced along a floor surface 11 which is to be cleaned, and it carries on its underside a cleaning device 13 which can be lowered onto the floor surface 11 which is to be cleaned, and can be raised from the same, in a manner which is known per se. The cleaning device 13 comprises two parallel cleaning tools in the form of two brush rollers 15, 16, which can each be made to rotate by a drive motor. FIG. 1 illustrates just the drive motor 18 of the brush roller 15; a corresponding drive motor is also provided for the brush roller 16 but, for reasons of clarity, has not been illustrated in the drawing.

The floor-cleaning machine 10 has, in a known manner, a cleaning-liquid tank and a dirty-liquid tank. Cleaning liquid, preferably water, can be taken from the cleaning-liquid tank and sprayed onto the floor surface 11 in order to facilitate the cleaning operation. Dirty liquid, that is to say a mixture of dirt and cleaning liquid, can be sucked up in a known manner from the floor surface 11, and transferred into the dirty-liquid tank, by means of a dirt pick-up device 20, which is disposed on the rear side 21 of the floor-cleaning machine 10.

Figure 2:
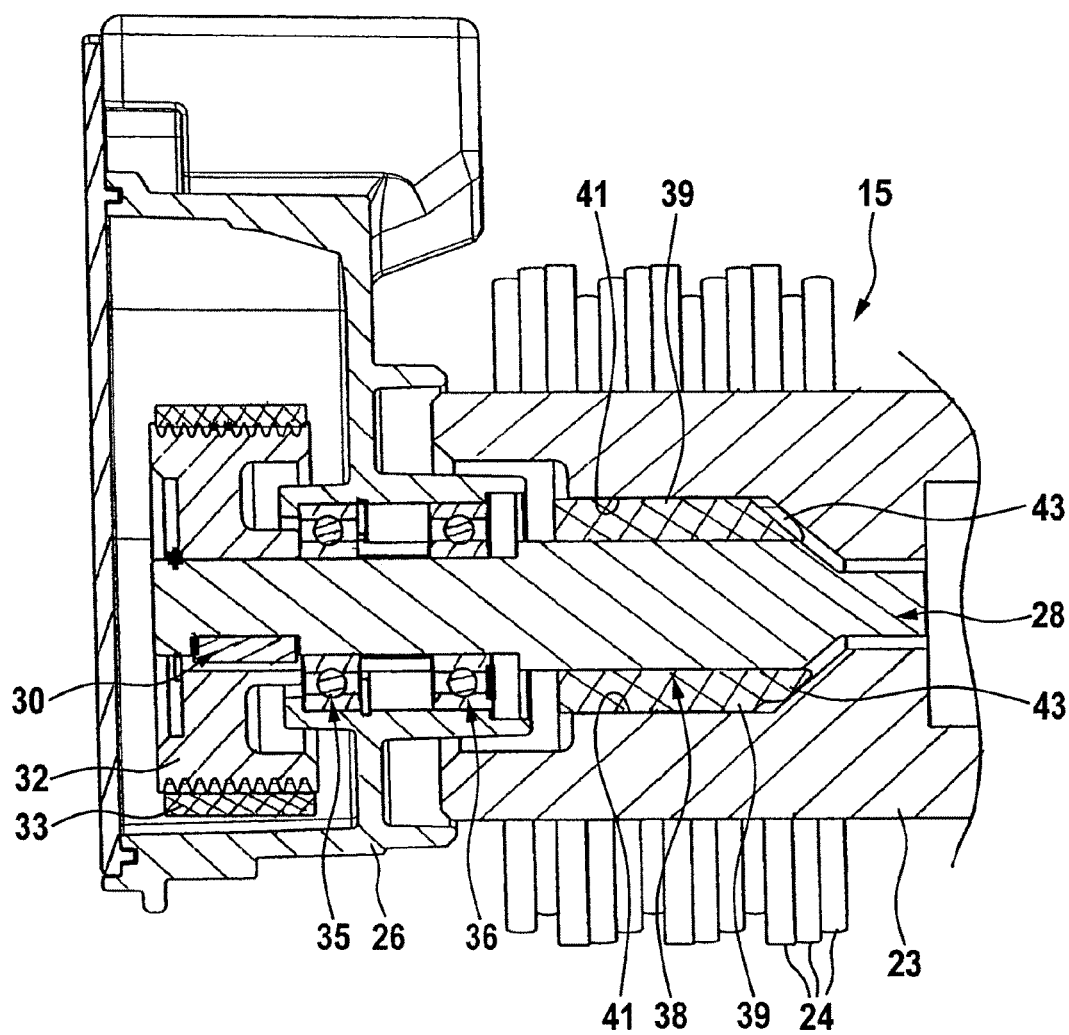
FIG. 2 shows a partial section of a cleaning tool of the cleaning machine from FIG. 1, the cleaning tool being mounted on a carrier by means of a drive shaft.
Figure 3:
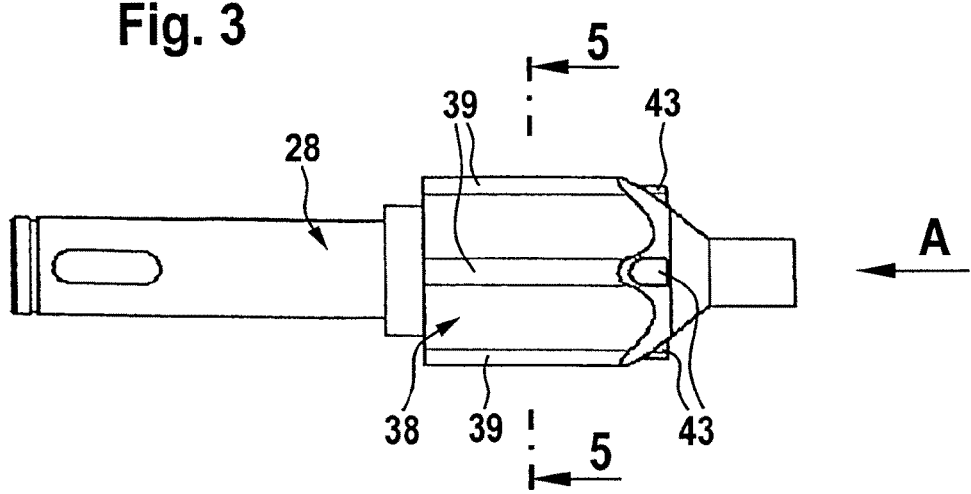
FIG. 3 shows a side view of the drive shaft from FIG. 2.
Figure 4:
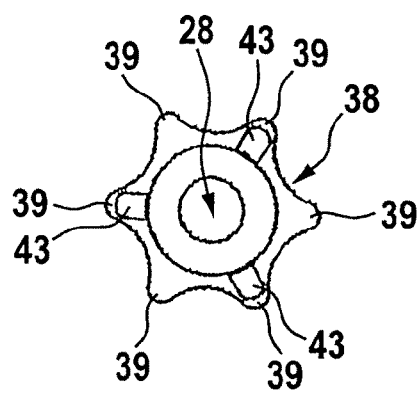
FIG. 4 shows a front view of the drive shaft as seen in the direction of arrow A from FIG. 3.
Figure 5:
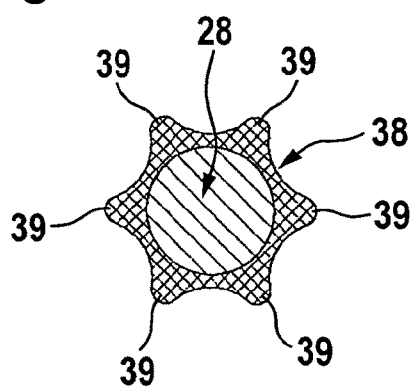
FIG. 5 shows a sectional view of the drive shaft along line 5-5 in FIG. 3.

The two brush rollers 15 and 16 each have a cylindrical roller body 23, from which a multiplicity of cleaning bristles 24 project radially on the outside. At its end, each of the roller bodies 23 is rotatably mounted on a carrier 26 of the cleaning device 13 by way of a drive shaft 28, the drive shaft 28 also causing the roller body 23 to rotate. The drive shaft 28 is illustrated in detail in FIG. 2 and, in particular, in FIGS. 3 to 5. It is made of metal and is connected in a rotationally fixed manner at one end, via a slot and key connection 30, to a belt pulley 32, which is coupled to the drive motor of the respective brush roller via a belt 33.

Directly adjacent to the belt pulley 32, the drive shaft 28 carries a first ball bearing 35 and, at an axial distance from the latter, a second ball bearing 36, via which the drive shaft 28 is retained in a rotatable manner on the carrier 26.

At an axial distance from the second ball bearing 36, the drive shaft 28 is enclosed by a torque-transmission member in the form of a drive wheel 38 which is made from plastics material, namely from a polyurethane material, and has been molded onto the drive shaft 28 following treatment of the drive shaft 28 with an adhesion-promoting agent. The drive wheel 38 has a star-shaped outer contour with rounded tips. This is evident, in particular, from FIG. 5. It engages, by way of its radially outwardly projecting protrusions 39, in complementary drive recesses 41 of the roller body 23 and thus makes it possible for a torque to be transmitted from the drive shaft 28 to the roller body 23.

In the axial direction, that is to say in the direction of the longitudinal axis of the drive shaft 28, tolerance-compensating members in the form of peg-like extensions 43 are integrally formed on three of the total of six protrusions 39, these extensions being spaced apart uniformly from one another and enclosing the drive shaft 28. The extensions 43 are connected integrally to the drive wheel 38, and form a single-piece plastics-material molding which is made of a polyurethane material and is molded onto the drive shaft 28.

The extensions 43 are rubber-elastically deformable and, when the drive wheel 38 is inserted into the corresponding drive recesses 41 of the roller body 23, subject the roller body 23 to an axial spring force. This makes it possible to dispense with an additional compression spring between the drive wheel 38 and the roller body 23.

The protrusions 39 and the extensions 43 of the drive wheel 38 have a significantly lower level of hardness than the drive shaft 28. The drive wheel 38 and the extensions 43 preferably have a Shore hardness of 70.

The relatively soft material of the drive wheel 38 and of the extensions 43 allows face-to-face engagement of the protrusions 39 and of the extensions 43 against the drive recesses 41 of the roller body 23. This, in turn, results in surface-area loading of the drive wheel 38 and of the extensions 43, and this makes it possible to keep the wear to which the drive wheel 38 and the extensions 43 are subjected to a low level. Furthermore, using the elastomeric material for the drive wheel 38 and the extensions 43 provides for damping, so that the level of noise produced during operation of the floor-cleaning appliance 10 can be reduced. A further advantage of using the elastomeric material lies in the fact that it is possible to avoid oscillation of the brush rollers 15 and 16.

Production of the drive wheel 38 with the protrusions 39 and the extensions 43 takes place in that the metallic drive shaft 28, the surface of which has been treated in the first instance by sandblasting and then with an adhesion-promoting agent, is introduced into a mold, and in that the drive shaft 28 is then encapsulated, over its longitudinal portion which penetrates into the drive recesses of the roller body 23, with polyurethane material to produce the drive wheel 38 and the axial extensions 43. In a following production step, the two ball bearings 35 and 36 can then be pressed onto the metallic drive shaft 28. Once the drive shaft 28 has been fitted on the carrier 26, the brush roller 15 or the brush roller 16 can be positioned on the drive shaft 28, the drive wheel 38, which is molded onto the drive shaft 28, penetrating in a positively locking manner, by way of its protrusions 39, into the drive recesses 41 of the roller body 23, and the elastomeric extensions 43 being compressed in the axial direction to subject the roller body 23 to an axial spring force.

The invention claimed is:

1. Cleaning machine, comprising:
a carrier,
a metal drive shaft rotatably mounted on the carrier,
at least one cleaning tool with drive recesses, the at least one cleaning tool adapted to be driven in rotation by the drive shaft
a torque-transmission member carried by the drive shaft, the torque-transmission member having protrusions adapted to engage in the drive recesses of the at least one cleaning tool,
wherein the torque-transmission member is made from a plastics material which is molded onto and encapsulates a longitudinal portion of the drive shaft, the longitudinal portion of the drive shaft carrying the torque-transmission member penetrates into the drive recesses of the at least one cleaning tool.

2. Cleaning machine according to claim 1, wherein the torque-transmission member has a Shore hardness of 60 to 80.

3. Cleaning machine according to claim 1, wherein the torque-transmission member is produced from a polyurethane material.

4. Cleaning machine according to claim 1, wherein the torque-transmission member has a star-shaped cross-sectional profile with rounded tips.

5. Cleaning machine according to claim 1, wherein at least one axially projecting tolerance-compensating member is disposed on the torque-transmission member.

6. Cleaning machine according to claim 5, wherein the at least one tolerance-compensating member is elastically deformable.

7. Cleaning machine according to claim 5, wherein a plurality of tolerance-compensating members are spaced apart from one another.

8. Cleaning machine according to claim 5, wherein the at least one tolerance-compensating member is produced from a plastics material.

9. Cleaning machine according to claim 5, wherein the at least one tolerance-compensating member and the torque-transmission member are connected integrally to one another and form a single-piece plastics-material molding.

10. Cleaning machine according to claim 1, wherein the at least one cleaning tool is configured as a brush roller.

* * * * *